(12) United States Patent
Bauer

(10) Patent No.: US 8,573,889 B2
(45) Date of Patent: Nov. 5, 2013

(54) MILLING ROBOT FOR PROCESSING THE INTERNAL WALLS OF INACCESSIBLE PIPELINES

(75) Inventor: Jens Bauer, Langebrück (DE)

(73) Assignee: IMS Robotics GmbH, Ottendorf-Okrilla (DE)

( * ) Notice: Subject to any disclaimer, the term of this patent is extended or adjusted under 35 U.S.C. 154(b) by 514 days.

(21) Appl. No.: 13/029,144

(22) Filed: Feb. 17, 2011

(65) Prior Publication Data

US 2011/0259460 A1 Oct. 27, 2011

(30) Foreign Application Priority Data

Apr. 22, 2010 (DE) .................. 10 2010 017 838

(51) Int. Cl.
*F16L 55/18* (2006.01)
(52) U.S. Cl.
USPC .............. 405/184.1; 15/104.05; 15/104.16; 15/104.095; 138/97
(58) Field of Classification Search
USPC .......... 405/156, 184.1, 184.2, 184.3, 184.4; 15/104.03, 104.05, 104.16, 104.095; 138/97
See application file for complete search history.

(56) References Cited

U.S. PATENT DOCUMENTS

| | | | | |
|---|---|---|---|---|
| 1,976,990 A * | 10/1934 | Guthrie | ................. | 15/104.05 |
| 2,579,813 A * | 12/1951 | Frank | ................. | 15/104.05 |
| 3,958,607 A | 5/1976 | Gray | | |
| 5,791,255 A | 8/1998 | Box | | |
| 6,138,311 A * | 10/2000 | LaNasa, Sr. | ............. | 15/104.095 |
| 6,276,398 B1 | 8/2001 | Lange | | |
| 6,887,014 B2 * | 5/2005 | Holland | ................. | 405/184.1 |
| 7,131,791 B2 * | 11/2006 | Whittaker et al. | ........ | 405/184.2 |
| 2004/0175235 A1 * | 9/2004 | Whittaker et al. | ............. | 405/51 |
| 2008/0213047 A1 * | 9/2008 | Bryant et al. | ............. | 405/184.2 |
| 2009/0080980 A1 * | 3/2009 | Cohen | ................ | 405/184.2 |
| 2010/0017980 A1 * | 1/2010 | Filippovitch | ............... | 15/104.05 |

FOREIGN PATENT DOCUMENTS

| | | |
|---|---|---|
| DE | 3408251 A1 | 9/1985 |
| DE | 9311145 U1 | 1/1995 |
| DE | 4417428 C1 | 11/1995 |
| DE | 19714464 A1 | 10/1997 |
| DE | 19815579 C1 | 7/1999 |
| DE | 19956421 C2 | 2/2002 |
| DE | 202004002132 U1 | 10/2004 |
| DE | 10306714 B4 | 3/2005 |
| DE | 102006034652 A1 | 2/2008 |
| DE | 102008021956 A1 | 11/2009 |
| GB | 2224328 A | 5/1990 |

* cited by examiner

*Primary Examiner* — Frederick L Lagman
(74) *Attorney, Agent, or Firm* — Michael Soderman

(57) ABSTRACT

A milling robot used to process the internal walls of inaccessible pipelines with a milling robot arm. The milling robot arm supports a milling head that is deflectable via remote control in the direction of the inner wall of the pipe. The milling robot arm stiffens and bends more or less depending on the controlled pressure feed; the eccentric, torsionally rigid, fixed-length core that can only be deflected in one plane provides a high level of torsional rigidity and the outer casing that is stiffened by the controlled internal pressure provides for a high level of stiffness in the longitudinal and bending directions. The milling robot arm can be swiveled all the way around in the inner pipe to be processed with the aid of a supply hose that is rigid in terms of shear or a pneumatically controllable slew ring.

10 Claims, 4 Drawing Sheets

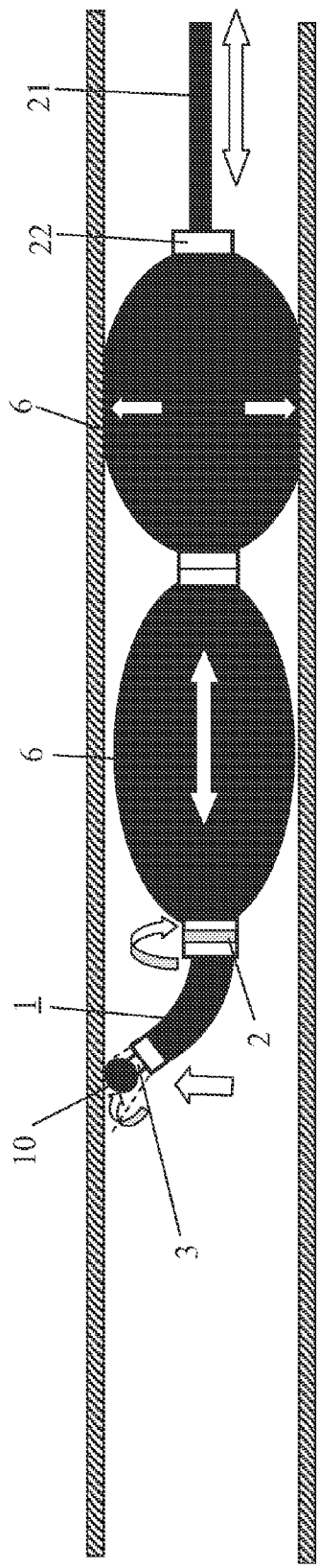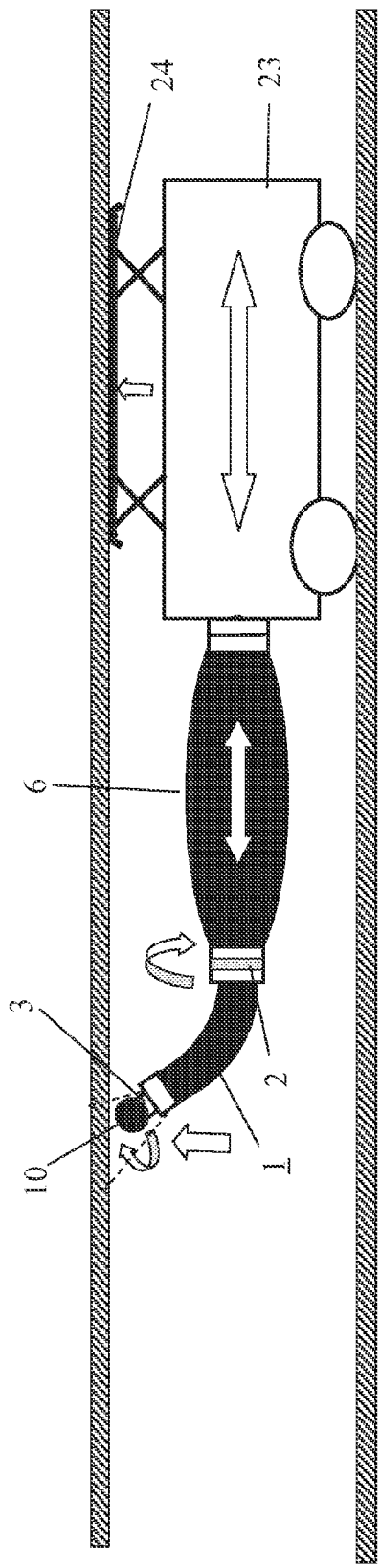

MILLING ROBOT FOR PROCESSING THE INTERNAL WALLS OF INACCESSIBLE PIPELINES

CROSS REFERENCE TO RELATED APPLICATIONS

This application claims the benefit of priority under 35 U.S.C. §119 of German Patent Application DE 10 2010 017 838.1 filed on Apr. 22, 2010, the entire contents of which are incorporated herein by reference.

FIELD OF THE INVENTION

The invention involves a milling robot for processing the internal walls of inaccessible pipelines with a milling robot arm that supports a milling head, that is deflectable via remote control in the direction of the inner wall of the pipe and that has an end flange supported by the housing body and a face flange supporting the milling head; the end flange and the face flange are connected with one another via a deflectable core, and a flexible supply line routed longitudinally along the milling robot arm supplies the milling head with drive power.

A generic milling robot of that type is known from DE 198 15 579 C1. According to that patent specification, a flexible core or two cardanically connected joint members are fastened to an end flange and a face flange of the milling robot arm and to the middle of its longitudinal axis; the milling robot arm is deflectable with the joint members via remote-control cables crosswise to the pipeline axis that are routed off-center vis-a-vis the longitudinal axis of the milling robot arm.

BACKGROUND OF THE INVENTION

It turned out that the milling robot arm of the milling robot according to DE 198 15 579 C1 can start to vibrate, both in the axial and in the radial directions, when there are very high engagement forces on the milling head due to the unavoidable inherent elasticity of the cables, which can make precise work difficult or even impossible. In addition, the design requires an independent control unit for each cable, which drives up the manufacturing costs and the control difficulty. The swiveling motion is also not expansive, which is why the use of different sizes of milling robots is required for different pipeline sizes, because only one joint member is available for each swivel direction. The compressed-air supply line for the milling head is outside of the milling robot arm and is consequently exposed to dirt and mechanical interference.

An inspection robot for pipe systems is known from DE 199 56 421 C2 with a camera head that is arranged on an elastic hose with a closed volume fastened down in a spiral; a leaf spring that is fastened down on both ends and that is matched with regard to its rigidity is attached on one side of the hose between the hose and the spiral. The leaf spring makes it possible to bend the tip with the camera head in a pneumatically adjustable way in proportion to the pressure when the hose is pressurized.

A device for inspecting sewers with a bending module that can be controlled in curves at the free end of a feed-unit housing is known from DE 20 2004 002 132 U1. The bending module essentially consists of a cylindrical bending jacket sealed against the atmosphere and a securing insert arranged on at least one side that prevents the axial expansion of the bending jacket during pressurization.

A bend decontamination packer for pipeline and sewer decontamination with an interior core in the form of a hose, a band, a cable or a chain that limits the longitudinal extension of the stretchable exterior cover is described in DE 10 2008 021 956 A1.

None of these devices or similar devices are torsionally rigid, either with regard to the rubber jacket or with regard to the core, which is why they are unsuitable for supporting rotating milling tools.

ADVANTAGES OF THE INVENTION

The construction expense is substantially reduced by the invention, because only a compressed-air connection has to be provided in the milling robot arm for the control unit of the milling head. The milling robot arm stiffens and bends more or less depending on the controlled pressure feed; the eccentric, torsionally rigid, fixed-length core that can only be deflected in one plane provides a high level of torsional rigidity and the outer casing that is stiffened by the controlled internal pressure provides for a high level of stiffness in the longitudinal and bending directions. The milling robot arm can be swiveled all the way around in the inner pipe to be processed with the aid of a supply hose that is rigid in terms of shear or a pneumatically controllable slew ring. All of the mechanical or electrical design elements for controlling the milling robot arm are consequently eliminated.

SUMMARY OF THE INVENTION

The invention is based on the problem of improving a milling robot of the type named above to the effect that its milling head will cushion the reaction forces against the inner pipe in a pressure controlled fashion even when there are high engagement forces. In addition, the construction expense is to be reduced, the engagement radius of the milling robot arm is to be increased and all of the supply lines are to be located within the protective jacket. The milling robot arm has to be torsionally rigid in and of itself in order to be able to draw off the reaction forces of the milling process from the milling head into the milling robot and therefore make material removal from the inner pipe possible in the first place.

The problem is solved in accordance with the invention by the features of claim 1. Advantageous design forms are specified in the accompanying claims.

BRIEF DESCRIPTION OF THE DRAWINGS

The following is shown in the accompanying drawings:
FIG. 3 shows a milling robot pushed with a sliding tube in a pipe
FIG. 4 shows a self-propelled milling robot in a pipe

DRAWINGS

Reference Numerals

Figure 1:
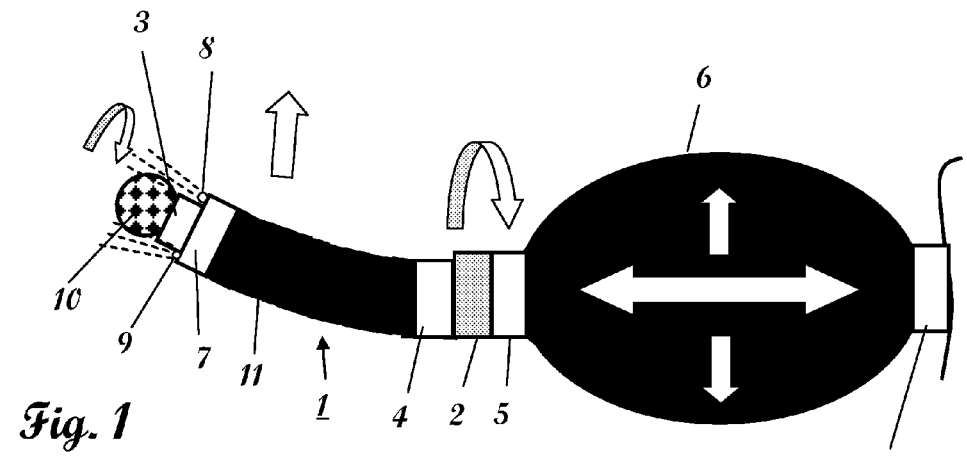
FIG. 1 shows a milling robot with a deflected milling robot arm

1 Milling robot arm
2 Slew ring of the housing body

3 Milling head
4 End flange of the milling robot arm
5 Face flange of the milling robot housing
6 Rubber balloon
7 Face flange of the milling robot arm
8 Camera
9 Lighting
10 Milling tool
11 Cylindrical outer casing of the milling robot arm
12 Pressurized chamber in the milling robot arm
13,14 Holes in the flanges of the milling robot arm
15 Supply line
16 Camera cable
17 Lighting cable
18 Hole for the pressure feed to the pressurized chamber
19 Pressure hose for the pressure feed into the pressurized chamber
20 Pintle chain
20a Block element
20b Side link plate
20c Rivet pins
20d Extension
21 Sliding tube
22 End flange of the milling robot housing
23 Traveling carriage
24 Clamping device of the traveling carriage
M Center line

DESCRIPTION OF THE PREFERRED EMBODIMENTS

The invention is to be explained in more detail with the aid of a preferred example. A milling robot in accordance with FIG. 1 has a milling robot arm 1 between a slew ring 2 driven by compressed air and a milling head 3 driven by compressed air. The slew ring 2 is screwed onto an end flange 4 of the milling robot arm 1 on one side and screwed onto a face flange 5 of a housing body of the milling robot that is not visible on the other side. The housing body of the milling robot has at least one thick-walled, reinforced rubber balloon 6. At least one rubber balloon 6 is reinforced at an angle that is predominantly axial in such a way that it stretches radially when it is blown up; the milling robot can be latched in place at any arbitrary location in a pipe without play or vibration in a pipe, not shown here, because of that. If a rubber balloon 6 is reinforced at an angle that is predominantly coaxial, in contrast, the milling robot arm 1 can be moved forwards and backwards with fine-motor precision. The milling robot arm can be rotated around its longitudinal axis with the aid of the slew ring 2, so that the its milling head 3, deflected towards a pipe wall that is not shown here, can generously reach any location in the pipe, even if it can only be deflected towards the pipe in one direction.

In addition to the milling tool 10, at least one camera 8 and a lighting unit 9 that is aligned in the direction of the milling tool 10 are on a face flange 7 of the milling robot arm 1 regardless of the operating position that the milling head 3 assumes. The housing body of a milling robot can have further structural components in addition to the rubber balloon(s) 6.

Figure 2:
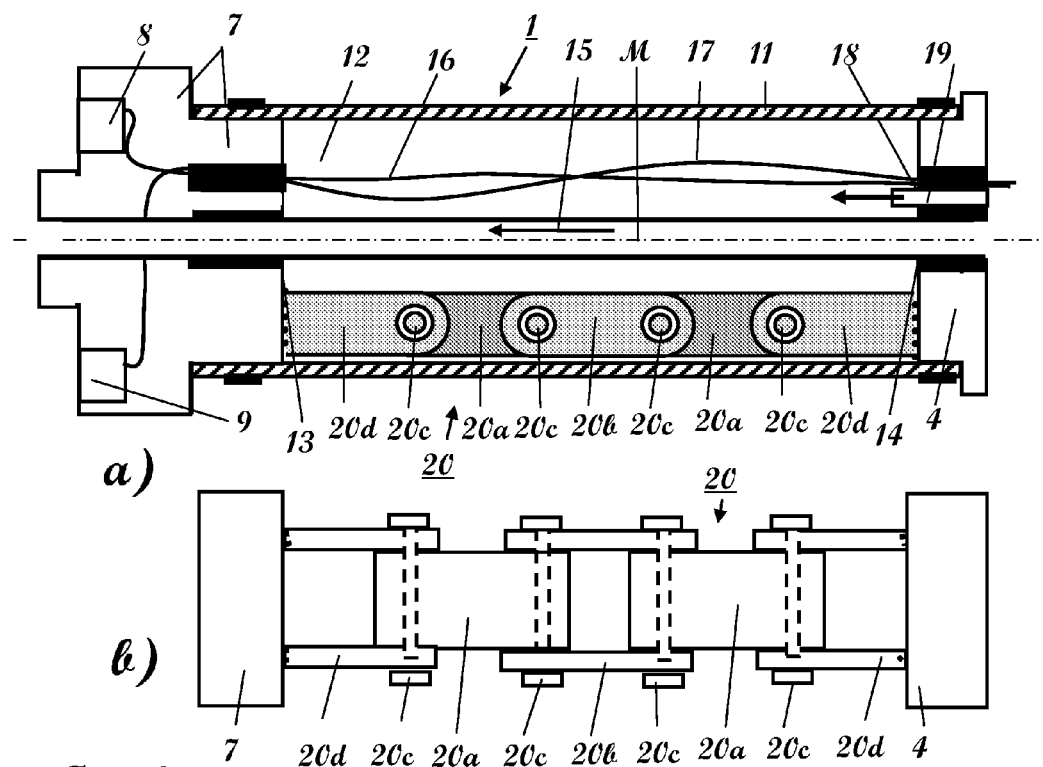
FIG. 2a shows a schematic cross-section through the milling robot arm with a torsionally rigid pintle chain
FIG. 2b shows the pintle chain from a top view

FIG. 2a shows a section through the milling robot arm 1 in a purely schematic fashion. A cylindrical, rubber-hose-type outer casing 11 forms a pressurized chamber 12 along with the front face flange 7 and the rear end flange 4 of the milling robot arm 1. A flexible supply line 15 that carries fluid, an elastomer pressure hose in the example that serves to supply compressed air to the milling tool 10, is routed through holes 13, 14 in the two flanges 7, 4. Further supply lines could also exist in the pressure hose. As an alternative, a wire-bound electrical power supply could be routed to a milling head with an electrical motor or a flexible shaft could be routed to a mechanically driven milling head in place of the pressure hose. In addition, a camera cable 16 is routed to the camera 8 and a lighting cable 17 is routed to a lighting unit 9. All of the supply lines are routed in a pressure-tight form through the two flanges 7, 4 of the milling robot arm 1 by means of penetration plugs that are not described in more detail. A pressure line 19 for the pressurized chamber 12 is routed through a further pressure-tight hole 18 in the end flange 4 of the milling robot arm 1 in order to be able to pressurize it with compressed air.

A robust, fixed-length, torsionally rigid pintle chain 20 that can only be deflected in one plane connects the two flanges 7, 4 of the milling robot arm 1 at an offset from the center line M of the outer casing 11 of the milling robot arm 1. The pintle chain 20 is a block chain with especially high torsional rigidity in the example; its block elements 20a consist of robust steel blocks with holes drilled into both ends that are connected to one another, free of play, by means of robust steel side link plates 20b with holes on both sides and robust steel rivet pins 20c. The pintle chain 20 has four joints 20c, two block elements 20a and three pairs of side link plates 20b, 20d, equally divided, in the example. The free ends of the side link plates 20b welded to the ends are positioned vis-a-vis the end flange 7, 4 of the milling robot arm 1 in such a way that the pintle chain 20 extends in an off-center fashion, but parallel with the center line M of the outer casing 11 within the pressurized chamber 12.

The pintle chain 20 is drawn separately once again from a top view in FIG. 2b.

The cylindrical outer casing 11 of the milling robot arm 1 consists of a rubber-elastic, especially elastomer material with high restoring force and is reinforced in a well-known way in the example with a high-strength, low-elasticity material such as steel wires or stranded wire at a steep angle to the longitudinal axis of the outer casing 11, so that it lengthens considerably in the axial direction when there is excess pressure, but only widens a slight amount. If a fluid, preferably compressed air, is brought into the pressurized chamber 12 through the pressure line 19, the outer casing 11 tries to extend itself. But it can only do that on the side that is opposite the pintle chain 20. The fixed-length pintle chain 20 does not permit an extension of the outer casing 11 on its side. Consequently the milling robot arm 1 bends in the direction of the pintle chain 20 in the interaction of forces. The milling robot arm 1 becomes extremely rigid longitudinally when a sufficiently high level of excess pressure exists; the pintle chain 20 in turn provides for extremely high torsional rigidity. The milling robot arm 1 becomes comparable to a solid body because of this, but its radius of curvature can be changed in a pressure-controlled manner. The flexible supply line 15, and thus an elastomer compressed-air house for supplying the milling head 3 with compressed air in the example, is only slightly stressed with regard to bending and pressure when there are bends in the milling robot arm 1; all of the other cables 16, 17 are in the pressurized chamber 12 of the milling robot arm 1 with the appropriate amount of play.

Reinforcement arrangements for a longitudinal extension, among other things, of a rubber-elastic jacket sealing up the pressurized chamber during pressurization are specified by DE 34 08 251 A1, for example.

Since the torsionally rigid pintle chain 20 can only be moved in one plane based on its function, provisions have to be made to enable the milling tool 10 to swivel in all directions to approach a work area in the inner pipe in a targeted way. In the design version of the invention according to FIG. 1, the slew ring 2 is positioned between the end flange 4 of the milling robot arm 1 and the face flange 5 of the housing body for this. Alternatively, the end flange 4 can also be self-rotating.

In the simplest case, the milling robot arm 1 can be axially twisted by means of a slide-resistant supply hose 21 that engages with the end flange 22 of the milling robot in accordance with FIG. 3. It simultaneously provides good service with regard to bringing the milling robot to the work location in the inner pipe. The milling robot is secured in place in the inner pipe without play by means of a robust rubber balloon 6 that absorbs the counter-pressure that has to be applied in the milling work. The rubber balloon 6 is blown up with excess pressure at the work location in such a way that the milling robot is firmly secured in place in the inner pipe or at least its play vis-a-vis the pipe wall is reduced to a minimum.

In FIG. 3, the housing body supports two rubber balloons 6 that are spaced close together. The milling robot can be secured crosswise at the work location in the pipe via remote control with the one rubber balloon 6, for example, after being brought in with the sliding tube 21 and can carry out longitudinal travel movements for required milling work in a remote controlled fashion with the other rubber balloon 6. The remote controllable, deflectable milling robot arm 1 sets the milling depth with regard to the pipe wall, and the position and length of the circular pipe arc to be processed can be set with the remote-control slew ring 2.

Alternatively, the milling robot can be moved in a well-known fashion by means of its own drive unit or an outside drive unit.

According to FIG. 4, the milling robot is moved to a work location with a traveling carriage 23. The traveling carriage 23 can be secured in the pipe in a remote-control fashion by means of a mechanical clamping device 24. But a rubber balloon 6 can also be of service here in making precision adjustments with regard to the milling location and/or additionally supporting the milling robot arm 1 during the milling work.

Any fluid in addition to compressed air is suitable in principle as a pressure medium for the milling robot arm 1 and otherwise for the milling head 3 and for the rubber balloons 6 as well, which is why the invention is not limited to milling robots operated with compressed air or controlled by compressed air; it can also be hydraulically operated, for example.

Figure 5:
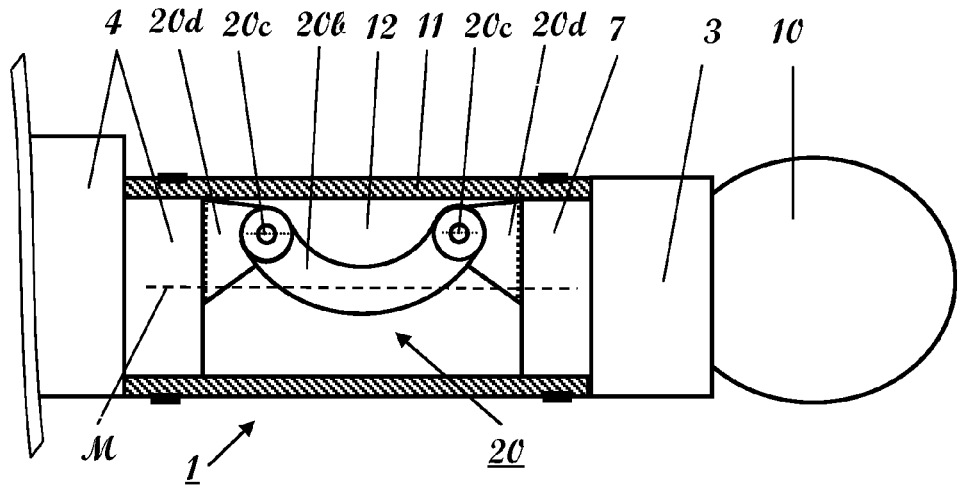
FIG. 5 shows a further variant of a pintle chain—stretched out
Figure 6:
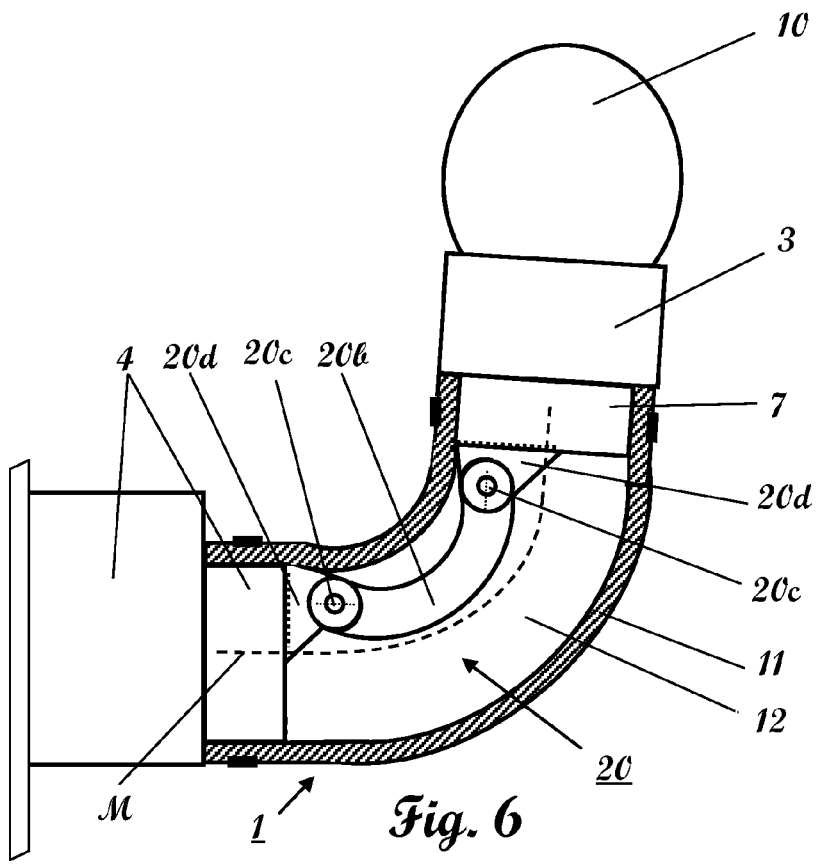
FIG. 6 shows the variant according to FIG. 5 with a deflected pintle chain

In FIGS. 5 and 6, a milling robot arm 1 is shown in a purely schematic fashion in an extended position (FIG. 5) and in a deflected position (FIG. 6); only the pintle chain 20 is drawn into the pressurized chamber 12 of the cylindrical outer casing 11. In the position according to FIG. 5, the outer casing 11 of the milling robot arm 1 is nearly pressureless; in the position according to FIG. 6, the outer casing 11 of the milling robot arm 1 is under the operating pressure. The milling robot arm 1 and therefore the milling tool 10 are stabilized in the interaction of the outer casing 11 that is under pressure and the pintle chain 20. The robust pintle chain 20 only consists, according to the version in accordance with FIGS. 5 and 6, of two joints and a joint member; the pintle chain 20 that can only be deflected in one plane becomes extremely rigid in terms of torsion because of that. The joint member can consist of both a block element 20a (FIG. 2) and, as drawn, two side link plates 20b. Both the end flange 4 and the face flange 7 of the milling robot arm 1 have extensions 20d; the rivet pins 20c realize the joint connection. The joint member is also arranged at an offset to the center line M of the outer casing 11 and within the pressurized chamber 12 here. It is crescent-shaped; its concave side is situated in such a way that the outer casing 11 can lean into the interior curve on this side, because its extension is prevented by the pintle chain 20, whereas the outer casing 11 can get as long on the other side that forms the exterior curve based on the pressure as the pintle chain 20 permits. The outer casing 11 can only widen to a very slight extent compared to its lengthwise extension due to the reinforcement with high-strength, low-elasticity wires, stranded wires or the like that are in turn embedded in the rubber material of the outer casing 11, oriented at a large angle with regard to the longitudinal axis of the outer casing 11.

In the previous examples, the pintle chains 20 arranged at a longitudinal offset to the center line M of the outer casing 11 run through the pressurized chamber 12 of the milling robot arm 1 in each case, but they can just as well be arranged outside of the pressurized chamber along the outer casing 11 and thereby be arranged once again at an offset to the center line M of the outer casing 11.

Figure 7:
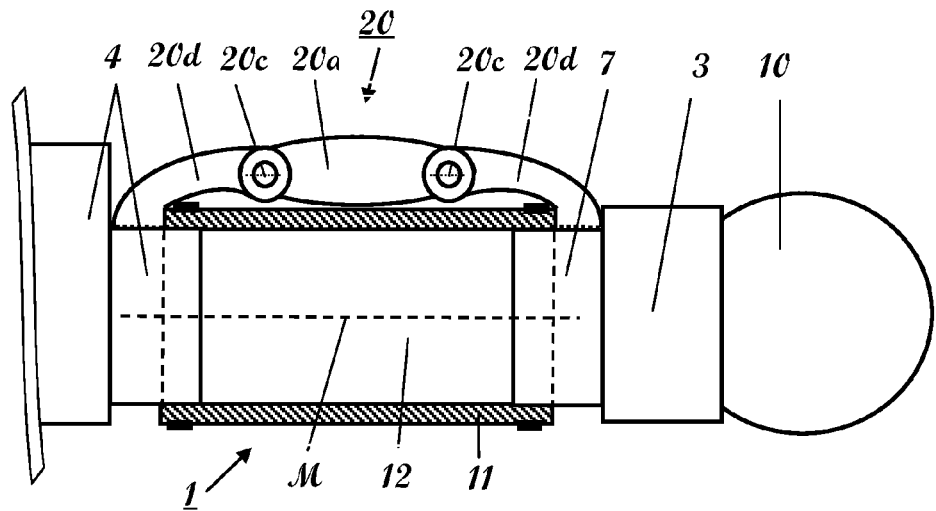
FIG. 7 shows a variant with an exterior pintle chain—stretched out and
FIG. 8 shows the variant according to FIG. 7 with a deflected pintle chain
Figure 8:
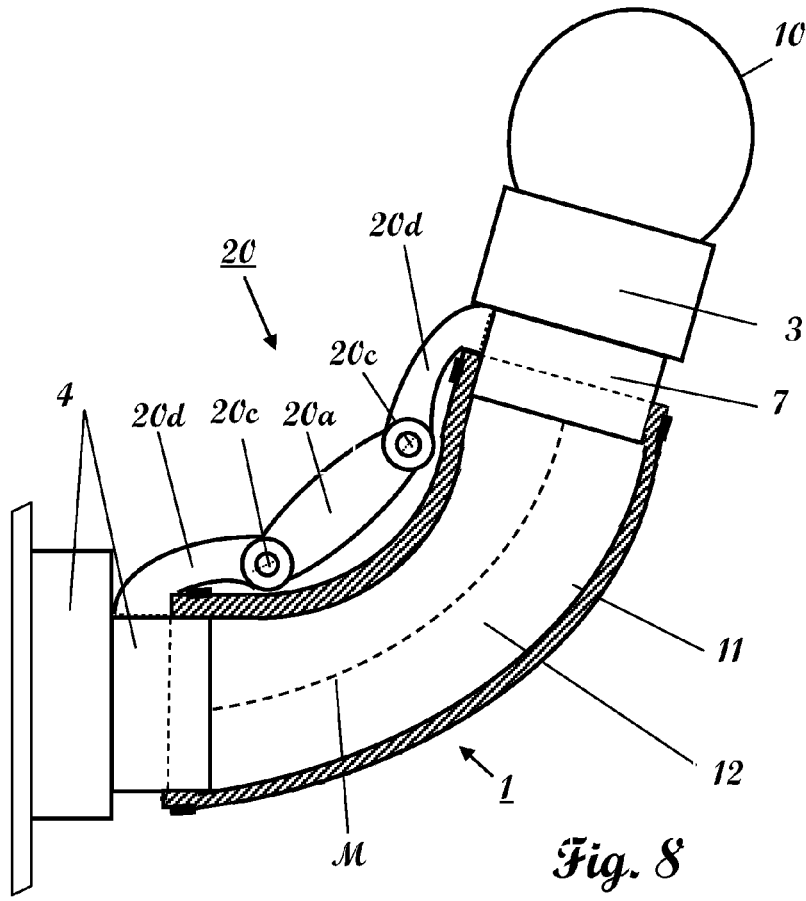

That is to be explained in more detail with FIGS. 7 and 8. Reference is made to the above-mentioned figures with regard to the essential components and their designations. In contrast to that, the two extensions 20d welded onto the flanges 4, 7 engage through the cylindrical outer casing 11. A joint member, for instance a block element 20a, connects the two extension lugs 20d through the rivet pins 20c that realize the joints. Consequently the pintle chain 20 only consists of one joint member and two joints, exactly as in FIGS. 5 and 6. The milling robot arm 1 is shown in an extended state in FIG. 7 and in a bent state in FIG. 8. It becomes clear, in comparison with FIG. 6, that the outer casing 11 does not just lengthen in the area of the outer curve, the outer casing 11 also lengthens in the area of the inner curve, although by a lesser amount; in a direction comparison, the milling robot arm 1 can work in a more expansive way than the one previously presented because of that.

What is claimed is:

1. Milling robot for processing the internal walls of inaccessible pipelines with a milling robot arm that supports a milling head, that is deflectable via remote control in the direction of the inner wall of the pipe and that has an end flange supported by a housing body and a face flange supporting the milling head connected with one another via a deflectable core, and a flexible supply line routed longitudinally along the milling robot arm supplies the milling head with drive power, characterized in that the core is a torsionally rigid, fixed-length pintle chain (20) which is only deflectable in one plane, that a cylindrical outer casing (11) which connects the end flange (4) to the face flange (7) sheathes a pressurized chamber (12) in a pressure-tight way, that the pintle chain (20) is longitudinally positioned at an offset to the center line M of the outer casing (11), and that the outer casing (11) is made of a rubber-elastic material with a high restoring force and is reinforced in such a way that excess pressure in the pressurized chamber (12) essentially influences its lengthwise extension, as a result of which the milling robot arm (1) deflects towards the pintle chain (20) when there is excess pressure, and an increasing restoring force is built up against the deflection with an increasing deflection in order to fix the milling head (3) in place in a certain position with regard to the pipeline wall in dependence upon the pressure in the pressurized chamber (12).

2. Milling robot according to claim 1,
characterized in that the flexible supply line (15) has a flexible pressure hose for a fluidic milling tool drive unit.

3. Milling robot according to claim 1,
characterized in that the flexible supply line (15) has a flexible cable for an electric milling device drive unit.

4. Milling robot according to claim 1,
characterized in that the flexible supply line (15) has a flexible shaft for a mechanical milling device drive unit.

5. Milling robot according to claim 1,
characterized in that the milling robot arm (1) has at least one camera (8) and one lighting unit (9) on its face side, in addition to the milling tool (10).

6. Milling robot according to claim 5,
characterized in that a camera cable (16) and a lighting cable (17) are routed through the pressurized chamber (12) of the milling robot arm (1) in a pressure-tight way.

7. Milling robot according to claim 1,
characterized in that the flexible supply line (15) is routed to the milling head (3) through the pressure-tight end flange (4) of the milling robot arm (1), the pressurized chamber (12) of the milling robot arm (1) and the pressure-tight face flange (7) of the milling robot arm (1).

8. Milling robot according to claim 7,
characterized in that the flexible supply line (15) supplies the milling head (3) with drive power, on the one hand, and supplies the camera (8) and the lighting unit (9) for visual observation, on the other hand.

9. Milling robot according to claim 1,
characterized in that the pintle chain (20) at an offset to the center line (M) of the outer casing (11) connects the end flange (4) to the face flange (7) through the pressurized chamber (12).

10. Milling robot according to claim 1,
characterized in that the pintle chain (20) at an offset to the center line (M) of the outer casing (11) connects the end flange (4) to the face flange (7) outside of the pressurized chamber (12).

* * * * *